United States Patent
Debnath et al.

(10) Patent No.: US 7,291,572 B2
(45) Date of Patent: Nov. 6, 2007

(54) SYNERGISTIC COMPOSITION FOR PREPARING HIGH CONCENTRATION FULLERENE ($C_{60}$) GLASS AND A METHOD FOR PREPARING THE GLASS IN BULK MONOLITH

(75) Inventors: Radhaballabh Debnath, Kokkatta (IN); Rampada Sahoo, Kolkatta (IN)

(73) Assignee: Council of Scientific & Industrial Research, New Delhi (IN)

( * ) Notice: Subject to any disclaimer, the term of this patent is extended or adjusted under 35 U.S.C. 154(b) by 148 days.

(21) Appl. No.: 10/491,371

(22) PCT Filed: Oct. 23, 2003

(86) PCT No.: PCT/IB03/04778

§ 371 (c)(1),
(2), (4) Date: Apr. 5, 2005

(87) PCT Pub. No.: WO2005/040054

PCT Pub. Date: May 6, 2005

(65) Prior Publication Data

US 2006/0111230 A1  May 25, 2006

(51) Int. Cl.
*C03C 1/00* (2006.01)
*C03C 14/00* (2006.01)

(52) U.S. Cl. .................................. 501/32; 252/582

(58) Field of Classification Search .............. 501/1, 501/11, 17, 27, 32, 96.1, 96.3, 153; 65/111, 65/134.1, 137

See application file for complete search history.

(56) References Cited

U.S. PATENT DOCUMENTS

| 5,172,278 | A | | 12/1992 | Tutt | |
|---|---|---|---|---|---|
| 5,331,183 | A | | 7/1994 | Sariciftci et al. | |
| 5,420,081 | A | | 5/1995 | Mattes et al. | |
| 5,741,442 | A | * | 4/1998 | McBranch et al. | 252/582 |
| 6,066,272 | A | * | 5/2000 | Tang et al. | 252/582 |
| 6,255,241 | B1 | * | 7/2001 | Miyazawa et al. | 501/99 |

FOREIGN PATENT DOCUMENTS

JP  2000 128574  5/2000

OTHER PUBLICATIONS

R. Sahoo and R. Debnath: Long-lived photoinduced Charge Separation in (Zinc,Lead) Phosphate Glass-C60 Composites. Adv. Mater. 15, 287 (2003).*
Lin, Mao, Meng, Zeng, "Fullerene Doped Glasses", Appl. Phys. Lett., vol. 65, No. 20, Feb. 26, 1994, pp. 2522-2524, XP992271547, p. 2525; figures 1-4.
IN 622/DEL/2001, R. Sahoo et al.

* cited by examiner

*Primary Examiner*—David Sample
*Assistant Examiner*—Abraham M. Matthews
(74) *Attorney, Agent, or Firm*—Squire, Sanders & Dempsey LLP

(57) ABSTRACT

The present invention relates to a synergistic composition for preparing high concentration fullerene ($C_{60}$)-glass and a method for preparing glass doped with fullerene ($C_{60}$) in bulk monolith using the synergistic composition, which may be used as a nonlinear photonic material and more particularly as a nonlinear optical medium and optical limiter.

15 Claims, 1 Drawing Sheet

Figure 1:
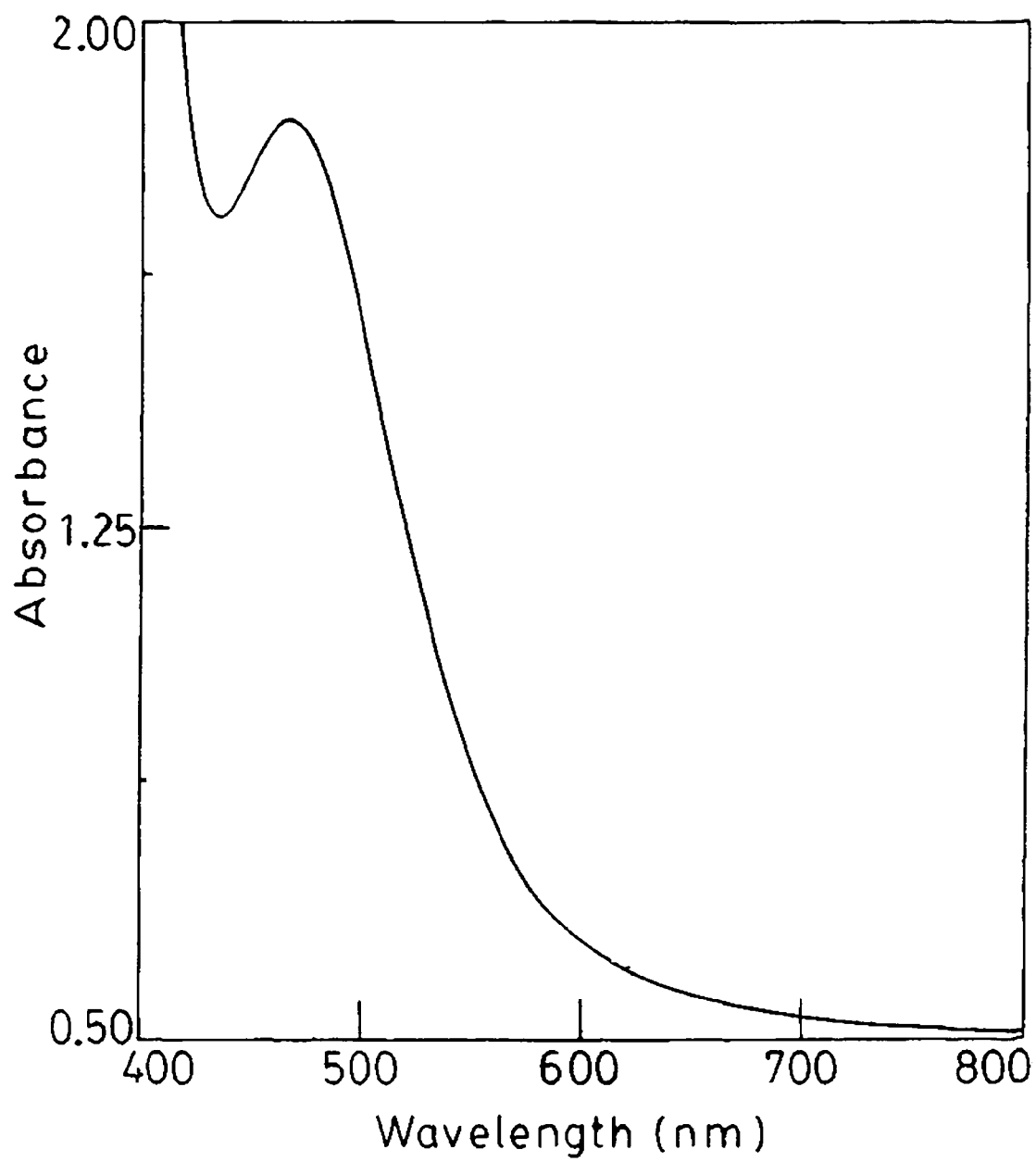

SYNERGISTIC COMPOSITION FOR PREPARING HIGH CONCENTRATION FULLERENE ($C_{60}$) GLASS AND A METHOD FOR PREPARING THE GLASS IN BULK MONOLITH

FIELD OF THE INVENTION

The present invention relates to a synergistic composition for preparing high concentration fullerene ($C_{60}$)-glass and a method for preparing glass doped with fullerene ($C_{60}$) in bulk monolith using the synergistic composition. The glass thus obtained is useful as a nonlinear photonic material and more particularly as a nonlinear optical medium and optical limiter.

BACKGROUND AND PRIOR ART DESCRIPTION

Fullerenes are a class of closed shell carbon molecules having interesting optical and opto-electronic properties. Amongst the various homologues of the series which may consist of carbon atoms ranging in number from 20 to 980 and even more (Science of Fullerene and Carbon nanotudes—M. S. Dresselhaus et al, Academic Press, 1996), the most stable and widely investigated molecules are $C_{60}$ and $C_{70}$ fullerenes. Structurally, $C_{60}$ and $C_{70}$ have similarity in the sense, they have extended network of conjugated delocalized pi-electrons which are distributed over the spherical fullerene surface. These compounds have a wide variety of remarkable properties. As in the case with many conjugated polymers, the electrical conductivity of $C_{60}$ and $C_{70}$ can be varied to make them insulators, semi conducting and even super conducting by controlled n-type doping. Lee W. Tutt (U.S. Pat. No. 5,172,278 dated Dec. 15, 1992) have first shown that both $C_{60}$ and $C_{70}$ fullerene solutions can be used as an optical limiter, transparent to low intensity light but nearly opaque above a critical intensity. One of the major difficulties in using fullerenes for all such applications is that they are unstable under ambient environmental condition. Oxygen and water in presence of light are known to react with fullerenes. So, for all practical device applications, it is necessary to encase fullerene in suitable solid host.

N. S. Sariciftci, A. J. Heeger (U.S. Pat. No. 533,183, dated 19 Jul. 1994) showed that fullerene $C_{60}$ and $C_{70}$ may be made technologically useful as photoconducting film by incorporating them into suitable organic conducting polymer. For optical and optoelectronic applications however, fullerene, incorporated in suitable glassy hosts, should be the most desired materials.

There are number of reports of carrying out experiment for encasing fullerene $C_{60}$ and $C_{70}$ in glassy hosts with limited success. In most of these cases, fullerene was tried to incorporate in silica host by sol-gel methods, e.g. methods described by B. R. Mattes, W. Duncan, J. M. Robinson, A. C. Koskelo and S. P. Love in U.S. Pat. No. 5,420,081 dated May 30, 1995 and by Sheng Dai, R. N. Compton, J. K. Young and G. Mamantov in J. of Am Cer. Soc. 75 (1992) 2865. In all these cases, preparation of thin films/plates of dimensions not larger than 13-15 mm×0.5 mm having clusters of $C_{60}$ or $C_{70}$ fullerene dispersed in the host, were reported. In some cases, certain derivatives of fullerene were used to prepare silica-$C_{60}$ fullerene composite by sol gel method (R. Signorini et at SPIE vol. 2854, page 130). In all these above mentioned composites, a major drawback is represented by the fact that fullerene is not totally protected from the environmental degradation by the water associated with the hosts.

F. Lin, S. Mao, Z. Meng and H. Zeng, J. Qiu, Y. Yue and T. Guo in Appl. Phys. Lett., 65 (1994) 2522, described a method for preparing $C_{60}$ fullerene doped phosphate glass by melting in a sealed device. The product obtained in this technique was found to contain in homogeneously dispersed fullerene clusters.

Recently R. Sahoo, S. K. Bhattacharya and R. Debnath in an Indian Patent entitled a novel process for preparing bulk monolith of Carbon sub sixty fullerene ($C_{60}$)-glass-composite useful in device applications as nonlinear optical medium and optical limiter", (No. 622/DEL/2001 dated May 29, 2001) described a method for preparing bulk monolith of fullerene ($C_{60}$)-glass of different compositions.

According to the above Patent Application, the glass composition contains 0-50 mole % phosphorous pentaoxide ($P_2O_5$), 0-40 mole % boron oxide ($B_2O_3$), 0-30 mole % bismuth oxide ($Bi_2O_3$), 0-1 mole % silicon dioxide ($SiO_2$), 0-1 mole % aluminum oxide ($Al_2O_3$), 10-45.5 mole % zinc oxide ($ZnO_2$), 10-40 mole % lead oxide (PbO), 0-0.1 mole % tin dioxide ($SnO_2$), 0-5 mole % $M_2O$ where M=Na, K, Li and 0.05-0.10 wt % fullerene ($C_{60}$).

However, it was noticed that the glass compositions used in this process have limitations in dissolving fullerene ($C_{60}$) in a high concentration. The composition described in the aforesaid Indian Patent Application is capable of keeping fullerene in the medium only in the dispersed condition. As a result, relatively higher concentration of fullerene namely fullerene concentration greater than 0.10 wt % cannot be incorporated in the glass composition. As it is preferable to incorporate higher and higher amounts of fullerene in the glass composition for device application such as optical limiter and non-linear media, in the present invention, the aforesaid patent application also has some drawbacks.

It is a commonly known principle that effective dissolution of a dopant in a host is achieved only when there occurs some short of interaction between the dopant and the host. The compositions disclosed in the patents in most cases, are not interactive with fullerene ($C_{60}$), although in some cases they are weakly interactive. Hence the processes can prepare glasses only with low concentration of fullerene.

The main drawbacks of the existing methods of preparation of fullerene doped glasses are as follows:

1) In the case of the fullerene doped sol-gel silica glass, fullerenes are not totally protected from environmental degradation as well as from the inherent water molecules associated with the host.
2) The sealed device melting method of preparing fullerene-phosphate glass composite does not yield a homogeneous product and at the same time suffers from its limitation in offering samples of useful dimensions.
3) Fullerene ($C_{60}$)-glass having high concentration of dissolved fullerene ($C_{60}$) can not be achieved using the glass compositions disclosed so far by the earlier workers. Even, the compositions recently suggested in the Applicant's earlier Indian Patent Application No. 622/DEL/2001 dated May 29, 2001 have limitations in dissolving fullerene ($C_{60}$) in a high concentration. This is because, compositions suggested in these earlier studies are in most cases, either not at all interactive or weakly interactive with fullerene ($C_{60}$).

In order to overcome all the above drawbacks, it is essential to provide a novel glass composition which is not only capable of dissolving high concentration of fullerene, but also capable of protecting the fullerene from environment degradation. Also, care should be taken to avoid formation of clusters of fullerene during the incorporation.

Keeping in mind all the above-criteria, the Inventors have devised a novel composition which is capable of incorporating 0.15 to 0.20 wt % of fullerene in the glass. The synergistic glass composition of the present invention is formulated judging the chemical reactivity of the ingredients as well as the reactivity of the resulting glass with the incorporated fullerene ($C_{60}$) to form bonds so that the glass can dissolve high concentration of fullerene ($C_{60}$) in its matrix. The Inventors have noticed that the ingredients and their concentration play a very vital role in overall properties of the glass thus produced. If the ingredients are changed or if the concentrations of the ingredients are varied beyond the ranges specified in the invention, the properties of the glass thus obtained are not satisfactory.

OBJECTS OF THE PRESENT INVENTION

The main object of the present invention is to provide a synergistic composition for preparing high concentration fullerene ($C_{60}$)-glass.

Yet another object of the present invention is to provide a method for preparing the glass in bulk monolith using the synergistic composition Still another object of the present invention is to provide a method for preparing the glass, which is simple and versatile for commercial exploitation.

One more object of the present invention is to provide a fullerene ($C_{60}$)-glass that is suitable for use as nonlinear photonic material in general and more particularly for various device applications as an efficient nonlinear optical medium, optical limiter.

DETAILED DESCRIPTION OF THE PRESENT INVENTION

Accordingly, the present invention provides a synergistic composition for preparing high concentration fullerene ($C_{60}$)-glass useful as a nonlinear photonic material in general and particularly in device applications as nonlinear optical medium and optical limiter, which comprises: 30-50 mole % of boron oxide ($B_2O_3$), 10-45 mole % of bismuth oxide ($Bi_2O_3$), 0 -5 mole % of silicon dioxide ($SiO_2$), 0-1 mole % of aluminium oxide ($Al_2O_3$), 0-30 mole % of zinc oxide (ZnO), 0-45 mole % of lead oxide (PbO) and 0.02-0.20 (wt) % of fullerene $C_{60}$.

In an embodiment of the present invention the boron oxide used may be taken either as boron oxide itself or as compounds containing boron oxide such as boric acid ($H_3BO_3$).

In another embodiment of the present invention the bismuth oxide used, may be taken either as it is or as compounds such as bismuth nitrate [$Bi(NO_3)_3$], bismuth chloride ($BiCl_3$) or bismuth sub nitrate [$OBi(NO_3)$].

In yet another embodiment of the present invention the aluminium oxide ($Al_2O_3$) used, may be taken either as it is or as aluminium hydroxide [$Al(OH)_3$].

In still another embodiment of the present invention the lead oxide used may be taken in the form of lead carbonate ($PbCO_3$), red lead ($Pb_3O_4$) or lead fluoride $PbF_2$.

In one more embodiment of the present invention, the concentration of fullerene used is preferably in the range of 0.10 wt % to 0.20 wt % and more preferably in the range of 0.10 to 0.16 wt %.

Also, the present invention provides a process for preparing glass incorporated with 0.02 to 0.20 wt % of fullerene ($C_{60}$) in bulk monolith, said process comprising the steps of:
(a) heating a mixture comprising of 30-50 mole % of boron oxide ($B_2O_3$), 10-45 mole % of bismuth oxide ($Bi_2O_3$), 0-5 mole % of silicon dioxide ($SiO_2$), 0-1 mole % of aluminium oxide ($Al_2O_3$), 0-30 mole % of zinc oxide (ZnO) and 0-45 mole % of lead oxide (PbO) at a temperature in the range of 400-850° C. to obtain a solid mass;
(b) crushing the solid mass into granules/powders;
(c) adding 0.02 to 0.20 wt % of fullerene ($C_{60}$) to the granules/powder of step (b), mixing the two intimately, heat treating the mixture at temperature in the range of 350-390° C. under vacuum and melting the mixture at a temperature in the range of 600-750° C. under inert gas-atmosphere, and
(d) cooling the melt of step (c) to obtain a transparent monolithic glass containing 0.02 to 0.20 wt % of fullerene ($C_{60}$).

In an embodiment of the present invention the boron oxide used may be taken either as boron oxide itself or as compounds such as boric acid ($H_3BO_3$).

In another embodiment of the present invention the bismuth oxide used, may be taken either as it is or as compounds such as bismuth nitrate [$Bi(NO_3)_3$], bismuth chloride ($BiCl_3$) or bismuth sub nitrate [$OBi(NO_3)$].

In yet another embodiment of the present invention the aluminium oxide ($Al_2O_3$) used, may be taken either as it is or as aluminium hydroxide [$Al(OH)_3$].

In still another embodiment of the present invention the lead oxide used may be taken in the form of lead carbonate ($PbCO_3$), red lead ($Pb_3O_4$) or lead fluoride $PbF_2$.

In one more embodiment of the present invention, the concentration of fullerene used is preferably in the range of 0.10 wt % to 0.20 wt % and more preferably in the range of 0.10 to 0.16 wt %.

In one another embodiment of the present invention wherein in step (a), the mixture of boron oxide, bismuth oxide, silicon dioxide, aluminium oxide, zinc oxide and lead oxide are heated in an alumina crucible.

In a further embodiment of the present invention wherein in step (C), the mixture of fullerene ($C_{60}$) and the granules is heat-treated in a carbon crucible.

In a further more embodiment of the present invention the inert gases used may be Helium, Nitrogen, Argon, or mixtures thereof.

The detailed process steps of the present invention are:
1. Heating at a temperature in the range 400-850° C. a synergistic glass composition of 30-50 mole % of boron oxide ($B_2O_3$), 10-45 mole % of bismuth oxide ($BiO_3$), 0-5 mole % of silicon dioxide ($SiO_2$), 0-1 mole % of aluminium oxide ($Al_2O_3$), 0-30 mole % of zinc oxide (ZnO), 0-45 mole % of lead oxide (PbO), in an alumina crucible to obtain a solid mass.
2. Crushing the sold mass into granules/powder.
3. Adding fullerene ($C_{60}$) to the granules/powder in the concentration range 0.02-0.20 overall wt % of the solid.
4. Mixing the two components intimately.
5. Heat treating the mixture in a carbon crucible at a temperature in the range of 350-390° C. under vacuum.
6. Melting the mixture at a temperature in the range of 600-750° C. under inert gas-atmosphere. Cooling the melt to obtain transparent monolithic glass containing 0.02 to 0.20 wt % of fullerene ($C_{60}$):

The novel and non-obvious finding of the present invention lies in the fact that the glass composition of the present invention is capable of dissolving the fullerene, thereby increasing the concentration of fullerene getting incorporated. More particularly, the chemical reactivity of the ingredients as well as the reactivity of the resulting glass with the incorporated fullerene ($C_{60}$) is such that the glass unexpectedly forms bonds with fullerene due to which the glass can dissolve high concentration of fullerene ($C_{60}$) in its matrix. The formation of bond not help in increasing the concentration of fullerene getting incorporated in the glass but also protects the fullerene from getting exposed to atmosphere.

Novelty of the present invention lies in selecting a synergistic composition for preparing high concentration fullerene ($C_{60}$)-glass in which fullerene ($C_{60}$) molecules efficiently interact with the host glass and remain homogeneously dispersed in the latter through bonding.

Another novelty of the present invention lies in providing a process for preparing bulk monolith of the high concentration fullerene ($C_{60}$)-glass in dimensions suitable for device applications as a nonlinear optical medium, optical limiter and in general, as a nonlinear photonic material.

Yet another novel and inventive feature due to which the monolith glass containing high concentration of fullerene glass is obtained is the use of two-step method of melting the glass. The two-step process of melting the mixture of fullerene ($C_{60}$) and the granules avoids environmental degradation of fullerene ($C_{60}$) at the time of incorporation of the latter in the glass. The method provided for preparing bulk monolith of the glass using the synergistic composition takes into account the nature of possible interaction of the glass with fullerene ($C_{60}$), interaction temperature, environment and the time etc.

Also, use of technique of heat treating under vacuum then melting under inert atmosphere in a furnace that can accommodate a batch ranging from small to moderate size.

The following examples provided below are by way of illustrations only and should not be construed to limit the scope of the present invention.

EXAMPLE-1

A glass containing high concentration of fullerene was prepared by using an intimate mixture of 0.28 mole of boric acid ($H3BO_3$), 0.07 mole of bismuth oxide ($Bi_2O_3$), 0.1225 mole of lead carbonate ($PbCO_3$) and 0.0175 mole of $SiO_2$—heating the batch in an alumina crucible in a furnace at 500-600° C. for half an hour—transforming the mass to a clear melt by raising the temperature up to around 800° C.—cooling the melt to solid—crushing the mass into powder—adding 14 mgm of $C_{60}$ fullerene to 15 gms of the powder—heat treating the mixture in a carbon crucible around 360-375° C. for 3 hrs under vacuum—finally melting the mixture at a temperature around 680° C. for 35 minutes under controlled atmosphere of nitrogen gas. The glass obtained was a monolithic sample having green color.

EXAMPLE-2

The fullerene containing glass in an amount 48 gm was also prepared by starting with a batch mixture of 0.27 mole of $H_3BO_3$, 0.21 mole of $Bi(NO_3)_3$, 0.057 mole of $PbCO_3$ and 0.003 mole of $Al_2O_3$—melting the batch in an alumina crucible in a furnace at around 650° C.—cooling the molten mass in the form of lump crushing the same into powder—adding 12 mgm of fullerene ($C_{60}$) to 48 gms of this host material-heat treating the mixture in a carbon crucible at 385° C. for 2 hour under vacuum—then melting the mixture at 750° C. for 20 mins to a vitreous liquid under controlled atmosphere of nitrogen. The glass obtained showed a reddish green color.

EXAMPLE-3

In an another trial, the glass was prepared by starting with a batch mixture of 0.1575 mole of $B_2O_3$, 0.033 mole of ZnO, and 0.315 mole of $OBi(NO_3)$,—melting the mixture in an alumina crucible by raising the temperature to around 820° C. in a furnace—cooling the melt to a glass—crushing the lump into frits—adding 10 mgm of ($C_{60}$) fullerene to about 6 gms of the frits—heat treating the mixture in a vitreous carbon crucible at around 370° C. for 1 hrs under vacuum—finally melting the mixture to a vitreous melt around 700° C. for 0.5 hr under controlled atmosphere of helium gas. The glass obtained was a monolithic sample with red color.

EXAMPLE-4

Another such glass was prepared by using a batch mixture consisting of 0.30 mole $H_3BO_3$, 0.02 mole of $Pb_3O_4$, 0.12 mole of $BiCl_3$ and 0.03 mole of ZnO—melting the batch in a platinum crucible to a sintered mass at a temperature around 700° C.—converting the mass in the form of granules—adding 9 mgm of ($C_{60}$) fullerene to 25 gms the former—mixing the components intimately—heat treating the mixture in a vitreous carbon crucible at around 370° C. for 1 hr under vacuum—then melting the mixture by increasing the temperature up to 725° C. for 20 mins. The glass obtained showed a reddish green color.

EXAMPLE-5

Similar glass was also prepared by using a batch of mixture 0.12 mole of $PbCO_3$, 0.294 mole of $H_3BO_3$ and 0.06 mole of $Bi(NO_3)_3$ and 0.003 mole of $SiO_2$—heat treating the mixture in an alumina crucible at around 550° C. for 5 hour to transform into a sintered mass—crushing the product into powder—adding 8.5 mgm of $C_{60}$ fullerene to 30 gms of the powder—mixing the two components intimately—heat treating the mixture in a carbon crucible at around 390° C. for 1 hr under vacuum—finally melting the same by raising the temperature to 730° C. for 30 mins under controlled atmosphere of argon to form glass with homogeneous dispersion of $C_{60}$ fullerene. The glass was of green colored.

EXAMPLE-6

A sample of such glass was also prepared by making a batch mixture of 0.03 mole of $Pb_3O_4$, 0.06 mole of $Bi(NO_3)_3$, 0.30 mole of $H_3BO_3$, and 0.03 mole of ZnO—melting the batch in an alumina crucible at around 700° C. to glassy mass—crushing the glassy mass into frits—adding 12 mgm of $C_{60}$ fullerene to 45 gms of the former—heat treating the new mixture in a vitreous carbon crucible at around 380° C. for 1 hr in a closed furnace under vacuum—finally melting the material at about 750° C. for 20 mins under a constant flow of nitrogen. The melt was cooled—the glass obtained had light green color.

Colored transparent monolithic glass samples containing high concentration fullerene ($C_{60}$), prepared in different size and shapes using glass compositions as described above, showed the existence of fullerene in the glass mostly as complex and partly as isolated molecules, as have been revealed from their color and also from their optical absorption study. These are shown in FIG. 1 of the drawing accompanying the specification. All the samples showed good optical limiting as well as other nonlinear optical properties.

The main advantages of the invention are:
1. The prescribed composition is suitable for dissolving high concentration of fullerene ($C_{60}$) in the glass through interactions between glass and fullerene.
2. It is superior to our previously disclosed compositions of Indian patent No. 622/DEL/2001 in respect of efficiency in dissolving fullerene ($C_{60}$) in high concentration through interaction with the latter.
3. The present method for preparing fullerene ($C_{60}$) glass can be used to prepare bulk monolith in dimensions useful in actual device applications.
4. The method is superior to sol-gel process both in respect of homogeneous dispersion and protection of fullerene ($C_{60}$) from environmental degradation.
5. The method is simple and cost effective for commercial exploitation.

We claim:

1. A synergistic composition for preparing high concentration fullerene ($C_{60}$)-glass useful as a nonlinear photonic material in general and particularly in device applications as nonlinear optical medium and optical limiter, said composition comprising: 30-50 mole % of boron oxide ($B_2O_3$), 10-45 mole % of bismuth oxide ($Bi_2O_3$), 0-5 mole % of silicon dioxide ($SiO_2$), 0-1 mole % of aluminium oxide ($Al_2O_3$), 0-30 mole % of zinc oxide (ZnO), 0-45 mole % of lead oxide (PbO) and 0.02-0.20 (wt) % of fullerene $C_{60}$.

2. A synergistic composition as claimed in claim 1, wherein the boron oxide used may be taken either as it is or as compounds containing boron oxide such as boric acid ($H_3BO_3$).

3. A synergistic composition as claimed in claim 1, wherein the bismuth oxide used may be taken either as it is or as compounds such as bismuth nitrate [$Bi(NO_3)_3$], bismuth chloride ($BiCl_3$) or bismuth sub nitrate [$OBi(NO_3)$].

4. A synergistic composition as claimed in claim 1, wherein the aluminium oxide ($Al_2O_3$) used may be taken either as it is or as aluminium hydroxide [$Al(OH)_3$].

5. A synergistic composition as claimed in claim 1, wherein the lead oxide used may be taken in the form of lead carbonate ($PbCO_3$), red lead ($Pb_3O_4$) or lead fluoride $PbF_2$.

6. A synergistic composition as claimed in claim 1, wherein the concentration of fullerene used is preferably in the range of 0.10 wt % to 0.20 wt % and more preferably in the range of 0.10 to 0.16 wt %.

7. A process for preparing glass incorporated with 0.02 to 0.20 wt % of fullerene ($C_{60}$) in bulk monolith, said process comprising the steps of:

(a) heating a mixture comprising of 30-50 mole % of boron oxide ($B_2O_3$), 10-45 mole % of bismuth oxide ($Bi_2O_3$), 0-5 mole % of silicon dioxide ($SiO_2$), 0-1 mole % of aluminium oxide ($Al_2O_3$), 0-30 mole % of zinc oxide (ZnO) and 0-45 mole % of lead oxide (PbO) at a temperature in the range of 400-850° C. to obtain a solid mass;

(b) crushing the solid mass into granules/powders;

(c) adding 0.02 to 0.20 wt % of fullerene ($C_{60}$) to the granules/powder of step (b), mixing the two intimately, heat treating the mixture at temperature in the range of 350-390° C. under vacuum and melting the mixture at a temperature in the range of 600-750° C. under inert gas-atmosphere, and (d) cooling the melt of step (c) to obtain a transparent monolithic glass containing 0.02 to 0.20 wt % of fullerene ($C_{60}$).

8. A process as claimed in claim 7, wherein the boron oxide used may be taken either it is or as compounds such as boric acid ($H_3BO_3$).

9. A process as claimed in claim 7, wherein the bismuth oxide used may be taken either as it is or as compounds such as bismuth nitrate [$Bi(NO_3)_3$], bismuth chloride ($BiCl_3$) or bismuth sub nitrate [$OBi(NO_3)$].

10. A process as claimed in claim 7, wherein the aluminium oxide ($Al_2O_3$) used may be taken either as it is or as aluminium hydroxide [$Al(OH)_3$].

11. A process as claimed in claim 7, wherein the lead oxide used may be taken in the form of lead carbonate ($PbCO_3$), red lead ($Pb_3O_4$) or lead fluoride $PbF_2$.

12. A process as claimed in claim 7, wherein the concentration of fullerene used is preferably in the range of 0.10 wt % to 0.20 wt % and more preferably in the range of 0.10 to 0.16 wt %.

13. A process as claimed in claim 7, wherein in step (a), the mixture of boron oxide, bismuth oxide, silicon dioxide, aluminium oxide, zinc oxide and lead oxide are heated in an alumina crucible.

14. A process as claimed in claim 7, wherein in step (C), the mixture of fullerene ($C_{60}$) and the granules is heat-treated in a carbon crucible.

15. A process as claimed in claim 7, wherein the inert gases used may be Helium, Nitrogen, Argon, or a mixture thereof.

* * * * *

UNITED STATES PATENT AND TRADEMARK OFFICE
CERTIFICATE OF CORRECTION

| | | |
|---|---|---|
| PATENT NO. | : 7,291,572 B2 | Page 1 of 1 |
| APPLICATION NO. | : 10/491371 | |
| DATED | : November 20, 2007 | |
| INVENTOR(S) | : Radhaballabh Debnath et al. | |

It is certified that error appears in the above-identified patent and that said Letters Patent is hereby corrected as shown below:

On the first page, below the title change the Inventors to read:

Item --(75)    Radhaballabh Debnath, Kolkatta (IN)--

Signed and Sealed this

Eleventh Day of March, 2008

JON W. DUDAS
*Director of the United States Patent and Trademark Office*

UNITED STATES PATENT AND TRADEMARK OFFICE
CERTIFICATE OF CORRECTION

PATENT NO.         : 7,291,572 B2                                         Page 1 of 1
APPLICATION NO. : 10/491371
DATED              : November 6, 2007
INVENTOR(S)        : Radhaballabh Debnath et al.

It is certified that error appears in the above-identified patent and that said Letters Patent is hereby corrected as shown below:

On the first page, below the title change the Inventors to read:

Item --(75)    Radhaballabh Debnath, Kolkatta (IN)--

This certificate supersedes the Certificate of Correction issued March 11, 2008.

Signed and Sealed this

First Day of April, 2008

JON W. DUDAS
*Director of the United States Patent and Trademark Office*